United States Patent
Sorensen, Jr. et al.

(10) Patent No.: US 7,534,029 B2
(45) Date of Patent: May 19, 2009

(54) IN-SITU TEMPERATURE DETECTION IN HIGH TEMPERATURE CERAMIC STRUCTURES

(75) Inventors: Charles Mitchel Sorensen, Jr., Corning, NY (US); Tinghong Tao, Big Flats, NY (US); Bin Wen, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 246 days.

(21) Appl. No.: 11/453,483

(22) Filed: Jun. 14, 2006

(65) Prior Publication Data

US 2007/0292657 A1 Dec. 20, 2007

(51) Int. Cl.
*G01N 25/02* (2006.01)
*G01K 3/00* (2006.01)

(52) U.S. Cl. .................. 374/104; 374/16; 374/101; 374/43; 374/25

(58) Field of Classification Search .......... 374/5, 374/45, 16, 101, 104, 43, 25, 179
See application file for complete search history.

(56) References Cited

U.S. PATENT DOCUMENTS

| | | | |
|---|---|---|---|
| 2,978,360 A | 4/1961 | Bradstreet et al. | 117/104 |
| 3,268,349 A | 8/1966 | Brixner | 106/39 |
| 5,212,130 A | 5/1993 | Addiego et al. | 502/60 |
| 5,217,305 A * | 6/1993 | Yamakawa et al. | 374/45 |
| 6,864,198 B2 | 3/2005 | Merkel | 501/80 |
| 6,974,249 B1 * | 12/2005 | Fair et al. | 374/102 |
| 7,043,964 B1 * | 5/2006 | Hickman | 73/40.7 |
| 7,179,316 B2 * | 2/2007 | Merkel et al. | 55/523 |
| 2002/0132720 A1 * | 9/2002 | Cutler et al. | 501/103 |
| 2005/0043166 A1 * | 2/2005 | Shinohara et al. | 501/97.1 |
| 2005/0044972 A1 * | 3/2005 | Jiang et al. | 73/866 |
| 2006/0064957 A1 * | 3/2006 | Ogunwumi et al. | 55/523 |
| 2006/0251909 A1 * | 11/2006 | Beall et al. | 428/454 |
| 2006/0281627 A1 * | 12/2006 | Ellison et al. | 501/134 |
| 2007/0119133 A1 * | 5/2007 | Beall et al. | 55/523 |
| 2007/0142208 A1 * | 6/2007 | Addiego et al. | 501/109 |

* cited by examiner

*Primary Examiner*—Gail Verbitsky
*Assistant Examiner*—Mirellys Jagan
(74) *Attorney, Agent, or Firm*—Matthew B. McNutt

(57) ABSTRACT

Ceramic structures such as catalyst supports or combustion exhaust filters that incorporate combinations of high temperature phase change materials, and methods for determining the thermal history of such ceramic structures, by disposing the phase change materials on or within the structures and subsequently detecting the presence or absence of phase changes in the materials after exposure to high temperatures.

10 Claims, 1 Drawing Sheet

IN-SITU TEMPERATURE DETECTION IN HIGH TEMPERATURE CERAMIC STRUCTURES

FIELD OF THE INVENTION

The present invention enables the collection of operating condition information attending the use of high temperature ceramic structures as catalyst supports and/or exhaust filters for the treatment of exhaust gases from carbonaceous fuel combustion processes. It is particularly adaptable for use with ceramic structures such as diesel particulate wall flow filters (DPFs) used for the removal of soot and other particulates from diesel engine exhaust gases.

BACKGROUND OF THE INVENTION

Diesel engines are a target of increasing development activity by combustion engine and motor vehicle manufacturers because they offer the potential for lower emissions and increased fuel economy as compared to gasoline engines. Diesel particulate filters (DPFs) are being developed as components of diesel engine exhaust systems in order to control particulate exhaust emissions by physically trapping soot particles present in exhaust steam in their structure. Among the diesel particulate filters being developed are porous ceramic wall-flow filters, i.e., porous honeycomb monoliths end-plugged in a manner that forces exhaust gas flow through the porous ceramic walls, collecting any particulates present in the exhaust gas on or within the upstream walls of the structures.

Over time, the particulates collected by the filter increase pressure drop across the filters and thus exhaust gas backpressure within the engine exhaust system. Therefore, once a predetermined soot loading condition is met, the filter is cleaned by a so-called "regeneration" cycle during which the temperature of the exhaust gases or filter are increased to a level sufficient to ignite and burn particulate soots. This regeneration cycle reduces the backpressure of the diesel particulate filter to approximately original levels.

The surfaces or interiors of the walls of these exhaust filters may support oxidations catalysts such as platinum (Pt), palladium (Pd), iron (Fe), strontium (Sr) or rare earth elements such as cerium (Ce), typically supported by high-surface-area washcoats, such catalysts acting to lower the temperatures required for soot combustion and filter regeneration. In flow-through ceramic catalyst supports used to treat gasoline engine exhaust gases, such catalysts promote the conversion of hydrocarbons and carbon monoxide in the exhaust gases to non-hazardous water vapor and carbon dioxide.

One preferred material for the manufacture of high temperature ceramic catalyst supports and filters is cordierite ($Mg_2Al_4Si_5O_{18}$), a refractory and low-thermal-expansion magnesium aluminum silicate offering high strength and good thermal shock resistance. Cordierite ceramics are typically manufactured by mixing raw batches comprising oxide sources such as talc and clay together with alumina and silica, binders such as methylcellulose, and lubricants such as sodium stearate to form plastic mixtures that can be extruded into green honeycomb shapes, dried, and fired to reaction-sinter the oxide materials into low-expansion ceramics.

Ceramic wall-flow filters made by the alternate channel plugging of these ceramic honeycombs can be extensively evaluated by diesel engine bench testing to evaluate catalytic performance, regeneration efficiency, filtration efficiency, pressure drop, and long-term durability. Such evaluations have demonstrated that soot loading distribution, flow distribution, catalyst distribution, and even the pore size distribution along the filter can directly influence the temperatures reached in honeycomb filters during the regeneration process.

To capture temperature changes arising in such filters during bench testing, arrays of thermocouples are inserted into the filters at various locations along the lengths and across the diameters of the filter structures. These thermocouples enable the precise determination of temperature levels and profiles along and across the filter as the regeneration cycles proceed. Instrumentation at these levels has confirmed that different locations within such filters reach different temperatures during regeneration, in some cases resulting in large temperature gradients within the filters and in others resulting in damage to the ceramic structure itself. Further, the temperatures and temperature gradients reached have been found to depend directly on the soot loadings present within the filters at the start of regeneration, and the manner in which the regeneration cycle is initiated and controlled by engine operating systems that can affect exhaust gas compositions and flow.

The maximum temperatures and temperature gradients reached during filter regeneration have been found to correlate directly with filter survivability and durability. Unfortunately, however, the extensive bench testing instrumentation used to determine peak filter temperatures and temperature gradients cannot be practically employed to measure or control the regeneration cycle in operating motor vehicles. Accordingly, there is no practical way of determining whether or when the design limits for long-term filter operation might have been exceeded during vehicle operation.

SUMMARY OF THE INVENTION

The present invention relates to the use of thermally active materials in ceramic structures including filters or catalyst substrates to detect and record the thermal history of the substrates or filters subjected to use. More particularly, the present invention involves the introduction of phase change materials into or onto the surfaces of filters or catalyst substrates that can indicate the peak temperatures to which such filters or substrates may have been subjected.

In a first aspect, then, the invention includes a novel method for determining the thermal history of a ceramic structure. In accordance with that method, at least two high temperature phase change materials are provided on or within the structure, each of which phase change material demonstrates at least one phase change with temperature. Thereafter the structure with supported phase change materials are put into use, such use necessarily involving exposures to elevated temperatures during which phase changes, most generally solid state phase changes, can potentially occur. Following such exposure, the method involves determining the presence or absence of a phase change in at least one of the phase change materials exposed to the elevated temperatures.

In a second aspect the invention provides a ceramic structure capable of exhibiting and/or preserving information concerning its thermal state or history during or following periods of high temperature use. That structure typically includes a catalyst substrate or filter formed of a refractory ceramic, and at least two high temperature phase change materials disposed on or within the catalyst substrate or filter. Examples of high temperature phase change materials for which the temperatures of phase transition have been established to be within ranges useful for indicating the thermal history of such ceramic structures include those selected from the group consisting of $Al_2O_3$, $ZrO_2$, $Ga_2O_3$, $TiO_2$, $Nb_2O_5$ and $CeO_2$.

The phase change materials to be employed may be incorporated into surface coatings, including coatings such as washcoats, which are widely utilized for pre-treating or applying catalysts to such ceramic structures. Alternatively, they may be incorporated into the batch materials from which the ceramic structures are formed, in order to directly incorporate the materials into the structures. The materials can be widely distributed within or over the surfaces of the structures, or they may be positioned within the structures at points where maximum temperatures are typically experienced in actual use. Broad distributions can enable the thermal history of the structures to be determined across the entire lengths and widths of the structures.

Pre-selected materials with suitable phase change temperatures may be added to the washcoat slurries used to coat such structures without any change in washcoating processes. Thus the invention obviates the need for thermocouples distributed through the structure that are relatively expensive to install and maintain, and that may unfavorably influence gas flow and/or temperature profiles across the structures. An additional advantage is that no changes to the engine control systems are needed for implementation of the invention.

Suitable phase change materials for use in accordance with the invention include inorganic materials exhibiting irreversible and detectable changes in attributes such as physical properties, chemical states, or physical states upon heating to temperatures within the operating ranges of ceramic substrates or filters. Thus when the temperature in a region of the ceramic structure is elevated beyond a transition temperature at which such a phase change will occur, the material attributes of the phase changed material(s) are irreversibly altered and the thermal history of the structure is thereby recorded for tracing in post-analyses involving either destructive or non-destructive testing methods. For example, a phase transition that is detectable by an X-ray diffraction analysis of the amorphous or crystallized material subsequent to a high temperature exposure is one suitable method for determining the minimum temperature to which the diffraction sample has been heated. Similarly, the use of multiple phase change materials in such samples can establish ranges of temperature for previous high temperature exposures.

The thermal history of a structure as determined by the above described methods can be effectively used to map the thermal profiles that may have been developed in such substrates or filters in use. Determining such profiles can help to establish whether structural failures in such structures resulted from thermal stresses, or instead from simple mechanical causes.

In summary, then, the present invention effectively provides: an in-situ monitoring system for the thermal history of a high temperature substrate; low monitoring cost due to the need for only small quantities of inexpensive phase-change materials; ease of ceramic manufacture due to the ease of incorporating phase change materials into coatings or batches; the ready availability of conventional and proven analytical methods and systems for the evaluation of phase changes in the incorporated materials; the absence of any adverse impact on gas flow within the channels of structures incorporating phase change materials; and the adaptability of the method to the use of on-line detection systems. Thus the invention provides cost-effective and highly efficient operating temperature determination methods when compared with known prior art procedures.

DETAILED DESCRIPTION

Figure 1:
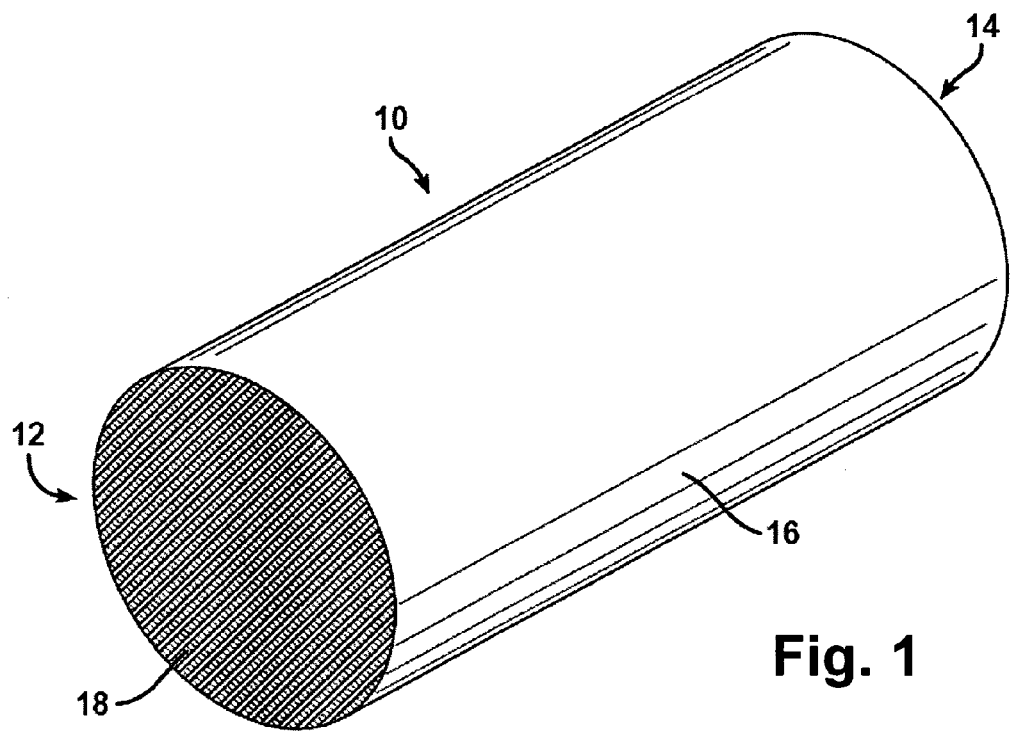
FIG. 1 is a schematic illustration of a wall-flow filter body according to an exemplary embodiment of the present invention.

A high temperature ceramic structure in the form of a porous ceramic honeycomb 10 provided according to the present invention is schematically illustrated in FIG. 1 of the drawings. Honeycomb structure 10 is composed of a body 16 having an inlet end 12, an outlet end 14, and a plurality of channels 18 extending in parallel between the inlet end 12 and the outlet end 14 of the body. For use as a diesel particulate filter, body 16 would further comprise an alternating pattern of plugs (not shown) disposed within alternate channels 18 on inlet end 12 and outlet end 14 of body 16, arranged in known fashion so that exhaust gases are forced through the porous walls 20 of the channels 18 in traversing the body from its inlet to its outlet.

Honeycomb structure 10 may be formed of any channel density; for example channel densities in the range of 100-400 channels per square inch of honeycomb cross-section are suitable for the construction of diesel engine exhaust filters, while densities of 300-1000 channels per square inch of honeycomb cross-section maybe selected for flow-through catalyst supports. For the purposes of the present description the term honeycomb is intended to include materials having a general honeycomb structure wherein cross-sectional channel shapes of square, hexagonal, triangular, square, circular, or any other open channel shapes may be provided.

In manufacturing a substrate for use in accordance with the present invention, a ceramic batch is first formed from carbide, oxide or mineral oxide (e.g. clay or talc) powders, the powders being blended with binders such as methylcellulose, lubricants such as sodium stearate, and a vehicle such as water to form plasticized powder mixtures for forming. The plasticized mixtures are then extruded or otherwise formed into green honeycomb bodies that are dried and fired to sinter or reaction-sinter the powders into porous ceramic honeycombs. U.S. Pat. No. 6,864,198 discloses examples of the preparation of cordierite ($Mg_2Al_4Si_5O_{18}$) honeycombs from batches comprising powder constituents such as talc, alumina, aluminum hydroxide, kaolin clay and silica.

Figure 2:
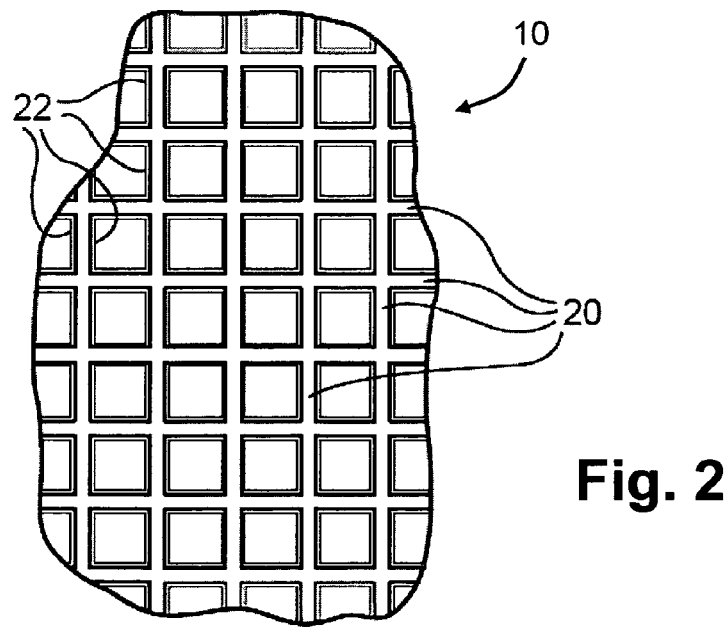
FIG. 2 is a detailed schematic illustration, in plan view, of a flow filter body according to an exemplary embodiment of the present invention.

As shown in FIG. 2 in enlarged sectional end view, a honeycomb such as honeycomb 10 of FIG. 1, which could be manufactured of cordierite as above described, could have channel walls 20 that are provided with a wash coating 22 that incorporates a phase change material. The coating may be applied widely or locally using any appropriate coating method, including liquid impregnation, washcoating, or chemical vapor deposition. If provided in a wash coating, the phase change material will typically be distributed widely on or within the walls 20 of the honeycomb and stabilized there by the step of calcining the washcoating.

For washcoating deposition, the particle size of the phase change materials may suitably be adjusted to be similar to that of the washcoating materials in order to avoid changing the viscosity of the washcoating slurry. The concentration of the phase change materials in the slurry will be adjusted to levels that will allow detection by X-ray diffraction or other methods when the substrate is analyzed following use, but generally not at levels to high as to interfere with the function of the ceramic product or any washcoating and/or catalyst provided thereon.

Most of the phase changes occurring in solid state materials involve changes in physical structure that can be detected by X-ray diffraction or similar techniques. While any suitable phase change material may be used, common and low cost materials such as alumina, titanium dioxide, zirconium dioxide, and niobium pentoxide may be favored due to their low reactivity with typical ceramic substrate materials and other materials commonly used for washcoating.

Alumina is an important material in catalysis because of its porous structure, fine particle size, high surface area, and high catalytic surface activity. As a result, alumina is widely used as a catalyst, an absorbent, and as a support for industrial catalysts. It is also used as a main component in the washcoat of catalyzed DPF to provide high dispersion of precious metals. γ-alumina is metastable and exhibits a phase change to δ-alumina at 900° C. Another phase change to α-alumina occurs at 1100° C. Each of these phases can be detected by X-ray powder diffraction to determine the maximum temperature reached during the life of the substrate. The presence of γ-alumina indicates a maximum temperature of less than 900° C.

Gallium oxide ($Ga_2O_3$) is readily available and commonly used in the semiconductor industry. At low temperatures the ε-phase of gallium oxide is stable; the ε-phase is converted to β-$Ga_2O_3$ at 870° C. The presence of ε-phase indicated a maximum temperature of less than 870° C., while the presence of β-phase indicates a maximum temperature in excess of 870° C.

Titanium dioxide ($TiO_2$) has extensive industrial applications and can exist in three crystalline forms, i.e., anatase, rutile and brookite. Anatase and rutile are tetragonal forms and brookite is orthorhombic. At about 750° C. the brookite phase is converted to anatase and at about 915° C. anatase is converted to the rutile structure.

Zirconium dioxide ($ZrO_2$) has three well-established polymorphs: monoclinic, tetragonal and cubic. The transition temperature from monoclinic to tetragonal is around 1100° C. Between 1000° C. and 1150° C. a tetragonal phase is present above 1350° C. a cubic phase is formed.

Niobium pentoxide ($NbO_5$), a very stable compound under a redox atmosphere, exists in at least four well-established polymorphic forms, including a pseudo hexagonal TT-phase, an orthorhombic T-phase, a higher temperature B-phase and an H-phase. The phase change temperatures are 410° C. for TT-phase to T-phase conversion, 817° C. for T-phase to B-phase conversion, and 960° C. for the B-phase to H-phase conversion.

By selecting a number materials such as alumina, gallium oxide, titanium dioxide, zirconium dioxide, niobium pentoxide with different phase change temperatures the maximum temperature to which a substrate has been heat may be precisely determined. By sampling the substrate at a number of different positions, the temperature profile across the substrate may be determined.

There are several selection factors that may be considered when selecting suitable phase-change materials for use as chemical temperature sensors. Among those are the degree of material compatibility with catalysts and/or catalyst support (washcoat) materials such as alumina, ceria, and precious metals, and with ceramic substrate materials such as cordierite, aluminum titanate, mullite, and/or silicon carbide. In most cases it is important that no solid state reactions are likely between the selected phase change material and the catalysts, washcoats, and ceramic supports under the range of operating conditions to be encountered.

Also desirable is that the selected phase change material be chemically stable under strongly oxidizing or reducing atmospheres, since oxidants and/or reducing species such as carbon monoxide, hydrocarbons, and some nitrogen oxides can be present in combustion exhaust gases. Typically, the phase change material will demonstrate good thermal and hydrothermal stability as well as good resistance to thermal cycling damage during the operating lifetime of the catalyst support or filter. Also, the phase changes of the selected material should be irreversible or nearly irreversible, and the material should have little or no adverse impact on the catalytic performance of any catalysts present in the system. Finally, the addition of the selected material into any washcoating slurry intended to be applied to the support or filter should not affect the physical or chemical properties of the slurry in a manner unacceptably interfering with washcoat adherence to the filter or support.

The presence of some dopants such as lanthanide components in these phase change materials may be useful where it predictably increases or decreases the phase transition temperatures exhibited by the materials. Other conditions such as heating rate, system pressure, and the existence of other materials can also influence the phase change temperature. Any materials that can meet some or all of the selection criteria discussed above can be used as chemical sensors on substrates. The in-situ temperature sensor technology of the present invention is applicable to a variety of products and applications.

In an offline detection system, a substrate or filter incorporating a phase change material such as described may be removed from the internal combustion engine and the thermal history may be determined with an off-line detection method such as x-ray diffraction. The substrate is typically cut to form a number of samples from any desired location for measurement of targeted characteristic physical properties or chemical states. This process provides information about filter in application as well as the thermal causes of substrate failure.

In an online detection system, the substrate may be heated and ongoing phase detection may be preformed. One advantage to an online detection system is that both reversible and irreversible material property changes may be monitored. The reversibly changing phases can operate as thermal sensors, while irreversible changes can be used as substrate failure indicators. Application methods suitable for the application of phase change materials to supports or filters in accordance with the present invention include washcoating, chemical vapor deposition, and thermal spraying, either individually or in conjunction with process steps such as catalyzation process or as a separate post-process step.

While the invention has been described above with reference to specific embodiments or examples thereof, those embodiments and examples are presented for purposes of illustration only and are not intended to be limiting. Thus a wide variety of alternative materials and methods may be selected for the purpose of carrying out the invention within the scope of the appended claims.

We claim:

1. A method of determining the thermal history of a ceramic structure comprising the steps of:
    exposing to an elevated temperature a fired ceramic structure comprising at least two phase change materials, each of which demonstrates at least one phase change with temperature
    determining the presence or absence of a phase change in at least one of said phase change materials after the exposing to said elevated temperature; and
    determining information regarding a temperature reached by the fired ceramic structure during the exposing to said elevated temperature based on the determining of the presence or absence of the phase change.

2. The method claim 1 wherein the exposing to said elevated temperature comprises exposing to said elevated temperature a ceramic structure comprising a washcoat containing at least one of the phase change materials.

3. The method claim 1 wherein the step of determining the presence or absence of a phase change comprises subjecting the at least one phase change material to x-ray diffraction analysis.

4. The method of claim 1, wherein the step of determining the presence or absence of a phase change comprises determining the presence or absence of a phase change in a plurality of phase change materials.

5. The method of claim 1, wherein the step of determining the presence or absence of a phase change comprises determining the presence or absence of a phase change at a number of positions of the ceramic structure.

6. The method of claim 1, wherein determining information regarding a temperature reached by the ceramic structure comprises determining information regarding at least one of a peak temperature and a temperature gradient of the ceramic structure during the exposing to said elevated temperature based on the determining of the presence or absence of the phase change.

7. The method of claim 1, wherein determining the presence or absence of a phase change comprises determining the presence or absence of a solid state phase change in at least one of said phase change materials after the exposing to said elevated temperature.

8. The method of claim 1, wherein the ceramic structure is a filter and wherein the exposing to said elevated temperature step occurs during regeneration of the filter.

9. The method of claim 1 wherein at least one of the phase change materials is selected from the group consisting of $Al_2O_3$, $ZrO_2$, $Ga_2O_3$, $TiO_2$, and $Nb_2O_5$.

10. The method claim 2 wherein the at least one phase change material is selected from the group consisting of $\gamma$-$Al_2O_3$, monoclinic $ZrO_2$, $\epsilon$-$Ga_2O_3$, anatase $TiO_2$, TT-$Nb_2O_5$, and T-$Nb_2O_5$.

* * * * *